United States Patent
Zolotow et al.

(10) Patent No.: US 11,119,654 B2
(45) Date of Patent: Sep. 14, 2021

(54) DETERMINING AN OPTIMAL STORAGE ENVIRONMENT FOR DATA SETS AND FOR MIGRATING DATA SETS

(71) Applicant: INTERNATIONAL BUSINESS MACHINES CORPORATION, Armonk, NY (US)

(72) Inventors: Clea A. Zolotow, Key West, FL (US); Thomas W. Bish, Tucson, AZ (US); Bernhard J. Klingenberg, Grover Beach, CA (US); Petra Kopp, Toenisvorst (DE); John V. Delaney, Kildalkey (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/031,654

(22) Filed: Jul. 10, 2018

(65) Prior Publication Data
US 2020/0019311 A1   Jan. 16, 2020

(51) Int. Cl.
*G06F 3/06* (2006.01)
*G06N 20/00* (2019.01)

(52) U.S. Cl.
CPC ............ *G06F 3/0604* (2013.01); *G06F 3/067* (2013.01); *G06F 3/0631* (2013.01);
(Continued)

(58) Field of Classification Search
CPC .... G06F 3/0604; G06F 3/0647; G06F 3/0644; G06F 3/0661; G06F 3/067; G06F 3/0631;
(Continued)

(56) References Cited

U.S. PATENT DOCUMENTS

| 7,533,230 B2 | 5/2009 | Glover et al. |
| 8,706,962 B2 | 4/2014 | Belluomini et al. |

(Continued)

FOREIGN PATENT DOCUMENTS

JP        2008027233 A        2/2008

OTHER PUBLICATIONS

Tony Barbagallo, "What's the Difference Between Block, File and Object-based Data Storage?", https://www.caringo.com/blog/back-basics-object-storage (Year: 2017).*

(Continued)

*Primary Examiner* — Kalpit Parikh
(74) *Attorney, Agent, or Firm* — Konrad Raynes Davda & Victor LLP; David W. Victor

(57) ABSTRACT

Provided are a computer program product, system, and method for determining an optimal storage environment for data sets and for migrating data sets. Metadata for each application indicates storage pools used by the application to store data sets, wherein each storage pool is configured in one of a plurality of storage environments using different organization schemes to store data sets. The metadata for at least one application indicates storage pools to store the data sets for the application that are allocated from different storage environments. The metadata for an application is processed to determine a data set for the application stored in a first storage pool implemented in a first storage environment that should be stored in a second storage environment. The determined data set from the first storage pool to a second storage pool implemented in the second storage environment.

27 Claims, 7 Drawing Sheets

(52) U.S. Cl.
CPC .......... *G06F 3/0644* (2013.01); *G06F 3/0647* (2013.01); *G06F 3/0661* (2013.01); *G06N 20/00* (2019.01)

(58) Field of Classification Search
CPC .... G06F 3/0649; G06F 3/0685; G06F 3/0605; G06N 20/00
See application file for complete search history.

(56) References Cited

U.S. PATENT DOCUMENTS

| | | | |
|---|---|---|---|
| 9,417,997 | B1 | 8/2016 | DeSimone et al. |
| 9,952,782 | B1 | 4/2018 | Chandrasekaran et al. |
| 2006/0161589 | A1 | 7/2006 | Krishnamoorthy |
| 2006/0218207 | A1* | 9/2006 | Nonaka ............... G06F 16/1794 |
| 2007/0050569 | A1* | 3/2007 | Haustein ................ G06F 3/067 |
| | | | 711/154 |
| 2008/0052331 | A1 | 2/2008 | Ogawa et al. |
| 2008/0091898 | A1* | 4/2008 | Takahashi ............. G06F 3/0605 |
| | | | 711/162 |
| 2014/0297697 | A1 | 10/2014 | Watanabe et al. |
| 2014/0297944 | A1 | 10/2014 | Abe |
| 2015/0172210 | A1 | 6/2015 | Sarkar et al. |
| 2015/0339076 | A1* | 11/2015 | Matsui .................... G06F 3/061 |
| | | | 711/170 |
| 2015/0381725 | A1 | 12/2015 | Haapaoja et al. |
| 2016/0335108 | A1 | 11/2016 | Ryu et al. |
| 2017/0017507 | A1 | 1/2017 | Mitsuno et al. |
| 2018/0129950 | A1 | 5/2018 | Kumar |
| 2018/0373722 | A1* | 12/2018 | Ulasen ................... G06N 20/00 |

OTHER PUBLICATIONS

"IBM Spectrum Scale Cognitive Storage Manages Unstructured Data for Cloud, Big Data, Analytics, Objects and More", IBM Corp., Apr. 2017, pp. 6.

"IBM Spectrum Scale V5.0 Delivers Software-Defined Storage Designed to Make Data Storage Management Simple, Efficient, and Intelligent at Any Scale", IBM Corp., Nov. 2017, pp. 19.

"Method and Apparatus to Determine Storage Usage and Backend Mapping by Applications on Software Defined Storage Systems", IP.com, IP.com No. IPCOM000240938D, Mar. 12, 2015, pp. 12.

"System and Method to Provide Storage Features as a Service for Workloads in a Cloud Computing Environment", IP.com, IP.com No. IPCOM000225164D, Jan. 28, 2013, pp. 3.

C. Mellor, "A looksee into storage upstart Hedvig's garage", The Register, [online][retrieved May 17, 2018] https://www.theregister.co.uk/2015/07/02/a_looksee_into_hedvigs_storage/, pp. 10.

"Ceph-osd—ceph object storage daemon", [online][retrieved May 17, 2018] http://docs.ceph.com/docs/master/man/8/ceph-osd/, pp. 2.

"Cloud migration with security and performance_f5", [online][retrieved May 17, 2018] http://f5.com/products/cloud-computing, pp. 4.

"IBM Knowledge Center—Storage pools", IBM Corp., [online][retrieved May 17, 2018] https://www.ibm.com/support/knowledgecenter/STKMQV_7.7.0/com.ibm . . . , pp. 3.

"Rethink the use of an object storage gateway for data migration", SeawrchStorage.com, [online][retrieved May 17, 2018] https://searchstorage.techtarget.com/tip/Rethink-the-use-of-an-object-stor . . . , pp. 1.

B. Haeusser, et al., "ILM Library: Information Lifecycle Management Best Practices Guide", IBM Corp., Redbooks document SG24-7251-00, Jan. 2007, pp. 326.

D. Quintero, et al., "Implementing an IBM InfoSphere BigInsights Cluster using Linux on Power", IBM Corp., Redbooks document SG24-8248-00, Jun. 2015, pp. 236.

S.A.Weil, et al., "CRUSH: Controlled, Scalable, Decentralized Placement of Replicated Data", IEEE, SC2006 Nov. 2006, Tampa, Florida, pp. 12.

"What is a ViPR virtual pool?", [online][retrieved May 17, 2018] https://uk.emc.com/techpubs/vipr/what_is_virtual_pool-1.htm, pp. 3.

PCT International Search Report and Written Opinion dated Dec. 5, 2019, pp. 9, for Application No. PCT/IB2019/055881, filed Jul. 10, 2019.

English Translation of JP2008027233 dated Feb. 7, 2008, pp. 34. US2008052331 is the English counterpart of JP2008027233.

* cited by examiner

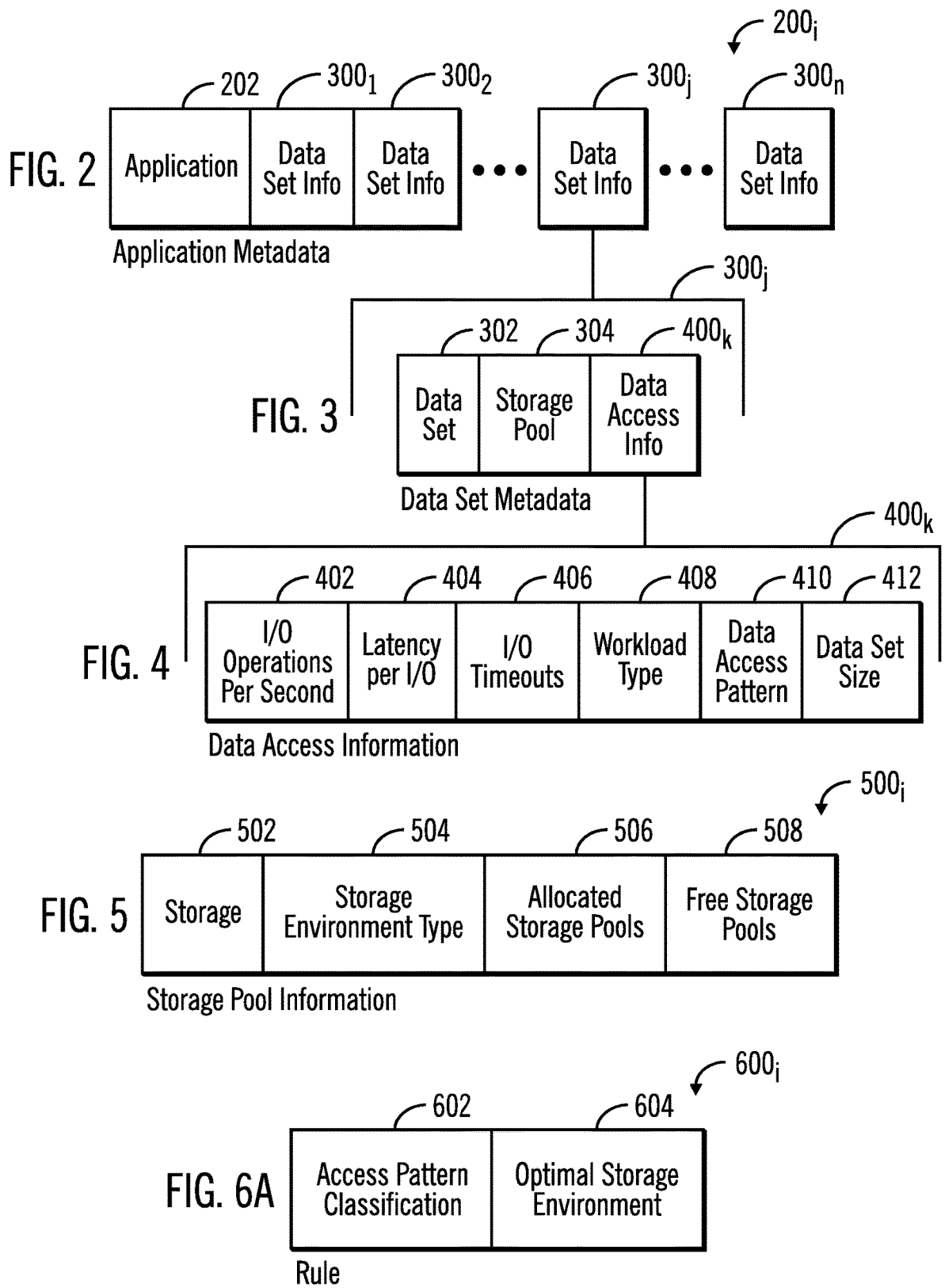

DETERMINING AN OPTIMAL STORAGE ENVIRONMENT FOR DATA SETS AND FOR MIGRATING DATA SETS

BACKGROUND OF THE INVENTION

1. Field of the Invention

The present invention relates to a computer program product, system, and method for determining an optimal storage environment for data sets and for migrating data sets.

2. Description of the Related Art

A storage system may implement different storage environments, such as a block storage, file storage, object storage, etc. The use of multiple storage environments complicates decisions on storage placement for data in the storage management lifecycle process. Storage administrators use a variety of tools to manage storage. Once a system is chosen (i.e., block-based storage for web-facing servers; file-based storage for print systems; and object-based storage for unstructured data such as pictures or file collaboration (as well as content streaming), the storage methodology is usually not changed until a technology refresh cycle.

There is a need in the art for improved techniques to manage locations in which to store data sets for applications.

SUMMARY

An embodiment comprises a computer program product, system, and method for determining an optimal storage environment for data sets and for migrating data sets. Metadata for each application indicates storage pools used by the application to store data sets, wherein each storage pool is configured in one of a plurality of storage environments using different organization schemes to store data sets. The metadata for at least one application indicates storage pools to store the data sets for the application that are allocated from different storage environments. The metadata for an application is processed to determine a data set for the application stored in a first storage pool implemented in a first storage environment that should be stored in a second storage environment. The determined data set from the first storage pool to a second storage pool implemented in the second storage environment.

With the above embodiment, metadata for an application is used to determine that a data set stored in a storage pool in a first storage environment should be stored in a second storage environment, so that the data set may be migrated to the second storage environment. In this way, metadata is used to determine a more optimal storage environment may be selected for a data set stored in storage pools used by an application so that the data set is migrated to the optimal storage environment.

In a further embodiment, the storage environments include at least a plurality of storage environments comprising: block storage, file storage, object storage and count key data (CKD) storage.

With the above embodiment, the one of different common storage environments may be involved in the migration to a data set among block storage, file storage, object storage and CKD storage to take advantage of the common storage environments that may be implemented in storage systems accessible to the application.

In a further embodiment, the metadata for the application is updated to indicate that determined data set is stored in the second storage pool.

With the above embodiment, the metadata is updated to reflect the new second storage pool and second storage environment to store the migrated data set, so that this metadata may be processed to determine whether there should be further migration of the set between storage environments.

In a further embodiment, a first daemon manages access to first storage configured according to the first storage environment and a second daemon manages access to a second storage configured according to the second storage environment. The data set is migrated by the first daemon reading the determined data set from the first storage pool in the first storage. The first daemon converts the determined data set from a first data format for the first storage environment to a second data format for the second storage environment. The data set in the second data format is sent to the second daemon to write to the second storage.

With the above embodiment, the storage environment daemons manage the transfer of data sets from a source storage environment to an optimal storage environment, where each of the daemons includes all the necessary functions and APIs to manage accessing data in their storage environment and to manage communication with other storage daemons as well as converting a data set to a data format of a target storage environment to which a data set is being migrated.

In a further embodiment, data access information on data access patterns of Input/Output (I/O) accesses to the data sets for applications stored in the first and second storage pools is gathered. The determining a data set in the first storage pool that should be stored in the second storage environment comprises determining that the data access information gathered for the data set indicate that the data set should be stored in the second storage environment.

With the above embodiment, the determination of an optimal storage is based on current operational parameters with respect to the data set being considered, such as a data access patterns of I/O accesses to optimize storage selection based on current data access patterns.

In a further embodiment, the determining that the data access information indicates that the determined data set should be stored in the second storage environment comprises providing the data access information in the metadata for the data set to a machine learning module. The machine learning module classifies the provided data access information into one of a plurality of access pattern classifications. Rules are applied to determine from the access pattern classifications for the data set an optimal storage environment of a plurality of storage environments in which the data set should be stored. The determined data set is classified as having an access pattern classification, wherein the applying the rules determines that the second storage environment is an optimal storage environment for the data set.

With the above embodiment, a machine learning module is used to classify data access information into an access pattern classification that is then applied to a rules engine to select an optimal storage environment. This use of the machine learning module provides an optimal or best access pattern classification based on access information, which may then be used to select the optimal storage based on the access pattern classification, because certain types of storage environments are more suitable for certain types of access patterns.

In a further embodiment, for each data set for which an optimal storage environment is determined, a determination is made whether the data set is stored in the determined optimal storage environment for the data set. Each data set that is not currently stored in the determined optimal storage environment for the data set is migrated to the determined optimal storage environment for the data set.

In a further embodiment, the classifying the data access information for the data set is performed by a machine learning algorithm that is trained to produce one of the access pattern classifications based on the data access information for the data set.

With the above embodiment, a machine learning algorithm is trained to select the access pattern selection based on actual access patterns to improve the predictive quality of the machine learning algorithm in classifying the data access information to provide improved selection of the storage environment to use for the data set.

In a further embodiment, the data access information includes, for different data sets, a plurality of I/O operations per second, latency in accesses, time-outs due to latency delays, data access pattern, workload type.

In a further embodiment, the storage environments include an object storage environment, file storage environment, and block storage environment. The rules to determine the optimal storage environment for each data set for the applications comprise at least a plurality of rules comprising: indicating the optimal storage environment as file storage for the data set in response to determining that the data set is accessed as a file; indicating the optimal storage environment as block storage in response to an access pattern classification for the data set comprising random access pattern; indicating the optimal storage environment as file storage in response to the access pattern classification for the data set comprising a sequential access pattern; indicating the optimal storage environment as block storage in response to the access pattern classification for the data set comprising a high operations per second access pattern; indicating the optimal storage environment as file storage in response to the access pattern classification for the data set comprising a low operations per second and processing unit intensive usage access pattern; indicating the optimal storage environment as block storage in response to the access pattern classification comprising low latency, wherein the low latency occurs for data accesses requiring low latency access; indicating the optimal storage environment as file storage in response to the access pattern classification comprising high latency and a data set size greater than a size threshold, wherein the high latency occurs for data accesses tolerating high latency without timing out; indicating the optimal storage environment as object storage in response to the access pattern classification comprising high latency tolerant and a data set size less than a size threshold; indicating the optimal storage environment as block storage in response to the access pattern classification comprising a transaction database access pattern; indicating the optimal storage environment as file storage in response to the access pattern classification comprising a file database access pattern; and indicating the optimal storage environment as block storage in response to the access pattern classification comprising a web database access pattern.

Further embodiments comprise a computer program product, system, and method for managing storage of data in a plurality of storage environments. Data access information for a data set in a current storage implemented in a current storage environment is provided to a classification engine that determines an access pattern classification of a set of access pattern classifications from the data access information for the data set. The access pattern classification is used to determine an optimal storage environment for the data set. The data set is moved to a target storage implemented in the optimal storage environment in response to the current storage environment not comprising the optimal storage environment.

With the above embodiment, the access pattern classification is determined from a classification engine that processes the data access information to provide an improved classification based on machine learning and testing. This improved classification is then used to select the most appropriate and optimal storage environment for the data set based on the actual access pattern of the data set.

In a further embodiment, the data access information includes at least a plurality of access attributes comprising I/O operations per second, latency in accesses, time-outs due to latency delays, data access pattern, workload type. The set of access pattern classifications include at least one access pattern classification based on one only access attribute and at least one access pattern classification based on multiple of the access attributes.

In a further embodiment, application metadata is provided for applications having data sets stored in storages in one of a plurality of storage environments, wherein each application metadata for an application indicates for each data set stored for the application a storage pool in one of storages and the data access information for the data set, wherein the application metadata indicates a plurality of the data sets for the application stored in storages in different storage environments.

BRIEF DESCRIPTION OF THE DRAWINGS

FIG. 2 illustrates an embodiment of application metadata.

FIG. 3 illustrates an embodiment of data set metadata for data sets in the application metadata.

FIG. 4 illustrates an embodiment of data access information for a data set in the data set metadata.

FIG. 5 illustrates an embodiment of storage pool information.

FIG. 6a illustrates an embodiment of a rule.

DETAILED DESCRIPTION

Described embodiments provide improvements to computer technology for managing data sets for applications in different available storage environments, such as block storage, file storage, object storage, etc. Described embodiments provide an automated technique for making a decision on whether to move a data set for an application to a different storage environment based on current operational attributes of the data set, such as data access information related to I/O processing and performance at the data set, and attributes of the data set. The integrated storage environment management system maintains metadata for each application indicating storage pools used by the application to store data sets for the application. Each storage pool is configured in one of a plurality of storage environments using different organization schemes to store data sets. The metadata for at least one application indicates storage pools to store the data sets for the application that are allocated from different storage environments. The metadata is provided to a machine learning module to process to determine an access pattern classification for a data set and from the access pattern classification, an optimal storage environment for the data set. If the data set is not currently stored in the optimal storage environment, then the data set may be migrated to the optimal storage environment. In this way, decisions to use a different storage environment for a data set are based on current operational parameters of the data set to determine whether the data set is being stored in the most suitable storage environment.

Figure 1:
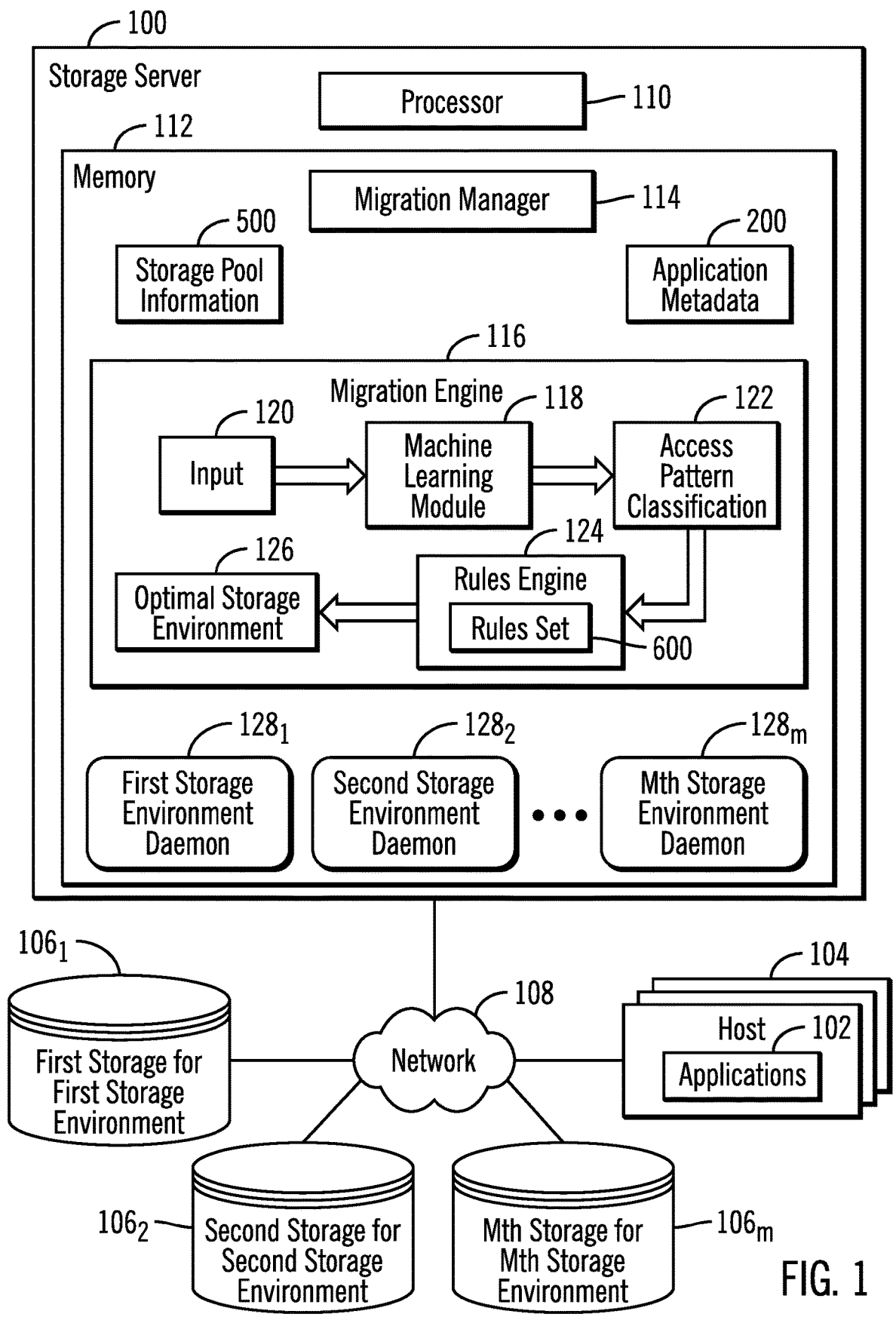
FIG. 1 illustrates an embodiment of a storage environment.

FIG. 1 illustrates an embodiment of a storage server 100 that receives Input/Output requests from applications 102 in host systems 104 to store in one of a plurality of storages $106_1, 106_2 \ldots 106_m$ for different first, second through mth storage environments, respectively. The components 100, 104, and $106_1, 106_2 \ldots 106_m$ communicate over a network 108. Different storage environments use different formats for data and metadata, and technologies for storing data sets for the applications 102, such as the storage environments of block storage, file storage, object storage, and count key data (CKD) storage. A file storage stores a data set as a file in a hierarchical file system, where metadata on the file and its content is stored in a file system. In block storage, the data set is stored as a block that has an address and Application Program Interfaces (API) that may be used to access and perform operations on the block. The block in a block storage is a chunk of data that may not have separate metadata. Block storage is optimal for performance centric applications, such as transactional database operations. In object storage, the data and metadata for the data are bundled and stored as an object, which has a unique identifier. In object storage, the user may define the format of the metadata, which is useful for analytics, and the objects may be accessed using a Hypertext Transport Protocol (HTTP) programming interface or any other suitable object access method.

The storages $106_1, 106_2 \ldots 106_m$ may be in the same or different data centers. Further, there may be additional separate storage systems for the same storage environment.

The storage server 100 includes a processor 110, such as one or more processor devices, and a memory 112 having program code executed by the processor 110. The memory 112 includes a migration manager 114 executed by the processor 110 to manage the migration of data sets in the storages $106_1, 106_2 \ldots 106_m$, application metadata 200 having metadata on data sets from the applications 102 stored in the storages $106_1, 106_2 \ldots 106_m$ including data set metadata 300 and data access information 400, and storage pool information 500 on storage pools configured in the storages $106_1, 106_2 \ldots 106_m$ allocated or free to store the data sets.

A migration engine 116 includes a machine learning module 118 to receive as input 120 some combination of the data access information 400 for a data set and produces as output an access pattern classification 122 that may be provided to a rules engine 124 that processes a rules set 600 of rules to determine an optimal storage environment 126 based on the determined access pattern classifications 122. The arrows shown in the migration engine 116 between the components 120, 118, 122, 124, and 126 are used to represent a data flow between the components, not actual structures within the migration engine 116

The machine learning module 118 implements a machine learning technique such as decision tree learning, association rule learning, artificial neural network, inductive programming logic, support vector machines, Bayesian models, etc., to determine an access pattern classification based on the input 120 data access information and other attributes of the data set. The machine learning module 118 may be trained to produce the different access pattern classifications for specific input data access information. In one embodiment, the machine learning modules 118 may comprise an artificial neural network program that may be trained using backward propagation to adjust weights and biases at nodes in a hidden layer to produce adjusted access pattern classifications for different combinations of data access information attributes, such as I/O operations per second, latency per I/O, number I/O timeouts, workload type, data set size, data access pattern, etc. The output optimal storage environments 126 are adjusted and the machine learning module 118 adjusted to produce desired optimal storage environments for different input data access information. In backward propagation, the margin of error of the output is measured and the weights and biases at nodes in the hidden layer are adjusted accordingly to decrease the error. Backward propagation may comprise an algorithm for supervised learning of artificial neural networks using gradient descent. Given an artificial neural network and an error function, the method may calculate the gradient of the error function with respect to the neural network's weights and biases.

The memory 112 may further include a storage environment daemon $128_1, 128_2 \ldots 128_m$ for each of the different storage environments available in the storages $106_1, 106_2 \ldots 106_m$. The storage environment daemons $128_1, 128_2 \ldots 128_m$ comprise programs or processes to access and format data for their respective storage environment and communicate with each other to transfer data from one storage environment to another. Further, each storage environment daemon $128_i$ may include program components to convert a data set in a data format for the storage environment i to a data format for another storage environment j, such as between any one of block storage, file storage, object storage, CKD storage, etc., and include the Application Programming Interfaces (APIs) to communicate with the storages configured for the storage environment i managed by the daemon $128_i$, such as direct connect, Transmission Control Protocol (TCP)/User Datagram Protocol (UDP) transfer, RESTful API (such as Amazon Simple Storage Service (S3)). (Amazon S3 and Amazon Simple Storage Service are service names, trademarks, registered trademarks or trade dress of Amazon Web Services (AWS) in the United States and/or other countries).

The migration manager 114, migration engine 116, machine learning module 118, rules engine 124, and daemons $128_1, 128_2 \ldots 128_m$ are shown in FIG. 1 as program code loaded into the memory 112 and executed by the processor 110. Alternatively, some or all of the functions of these programs may be implemented in hardware devices in the storage server 100, such as in Application Specific Integrated Circuits (ASICs) or executed by separate dedicated processors.

The storages $106_1, 106_2 \ldots 106_m$ may be implemented in different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1$ ... $112_m$, such as Just a Bunch of Disks (JBOD), Direct Access Storage Device (DASD), Redundant Array of Independent Disks (RAID) array, virtualization device, etc. Further, the storage devices implementing the storages $106_1$, $106_2$ ... $106_m$ may comprise heterogeneous storage devices from different vendors and different types of storage devices, such as a first type of storage devices, e.g., hard disk drives, that have a slower data transfer rate than a second type of storage devices, e.g., SSDs.

The memory 112 may comprise a suitable volatile or non-volatile memory devices, including those described above.

FIG. 2 illustrates an embodiment of an instance of application metadata $200_i$ in the application metadata 200 for an application 202 comprising one of the applications 102, and includes data set information $300_1$, $300_2$ ... $300_n$ for each of the n data sets from the application 202.

FIG. 3 illustrates an embodiment of an instance of data set information (metadata) $300_j$ for a data set $300_j$ of the application 202, and indicates a data set name 302, a storage pool 304 in which the data set 302 is stored, and data access information $400_k$ having attributes of data access in the data set. Different data sets for an application may be stored in storage pools in storages $106_1$, $106_2$ ... $106_m$ implemented in different storage environments, or in a same storage environment.

FIG. 4 illustrates an embodiment of an instance of data access information $400_k$ for one data set $300_j$ in the application metadata $200_i$ for one of the applications 102, and includes, by way of example, attributes of data access, such as I/O operations per second 402, which may comprise an average of the number of I/O operations per second for a measured interval, such as a time period interval or number of operations interval, such as number of start sub-channel (SSCH) operations; a latency per I/O operation 404, which may comprise an average of the latency in processing I/O requests for the measured interval; a number of I/O timeouts 406 during the measured interval; a workload type 408 of the data access, such as transaction database operations, application operations, critical operations, database file operations, etc.; a data access pattern 410, such as sequential or random; and a data set size 412 of the data set 302. Additional attributes of data access may also be maintained in the data access information $400_k$.

The application metadata information in FIGS. 2, 3, and 4 provides information on the data sets used by an application, storage pools assigned to the data sets which may be implemented in different storage environments, and the data access information for each data set.

FIG. 5 illustrates an embodiment of an instance of storage pool information 500, maintained for each storage pool in the different storages $106_1$, $106_2$ ... $106_m$, and includes a storage 502 in which storage pools are implemented, such as one of the storages $106_1$, $106_2$ ... $106_m$; a storage environment type in which the storage 502 is configured, e.g., file storage, block storage, object storage, CKD storage, etc.; allocated storage pools 506 identifying storage pools in the storage 502 allocated to data sets for the applications 102; and free storage pools 508 available to be allocated to store data sets for an application 102.

FIG. 6a illustrates an embodiment of an instance of a rule $600_i$ in the rules set 600, and includes an access pattern classification 602, comprising output 122 from the machine learning module 118, and an optimal storage environment 604 for the classified access pattern classification.

Figure 6B:
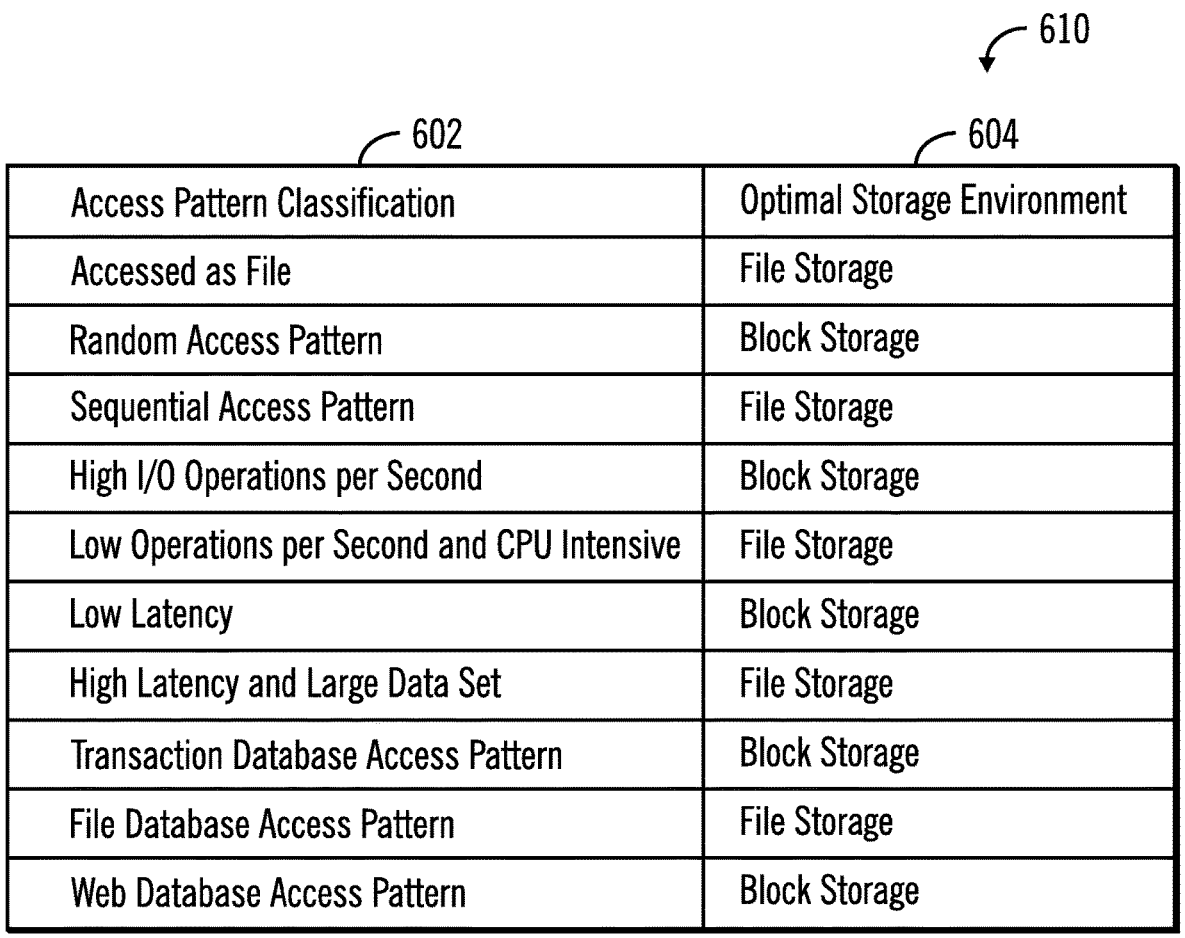
FIG. 6b illustrates an embodiment of a rules set.

FIG. 6b illustrates an example of the rules 600 implemented in a table 610 where each of the rules $600_i$ provides an access pattern classification 602 and corresponding optimal storage environment 604 for the access pattern classification 602. An administrator may update the rules table 610 by deleting or modifying rules, or adding new optimal storage environments for different access pattern classifications.

In certain embodiments, the access pattern classification 122 may comprise a single classification. In further embodiments, the access pattern classification may comprise a combination of multiple classifications, e.g., high latency and large data set. In such case, the rules set 600 may provide a specific optimal storage environment for a combination of access pattern classifications. If the output access pattern classification 122 comprises a combination of classifications, and the rules set 600 only provides an optimal storage environment 604 for just one classification of the combination, then the rules engine 124 may output as the optimal storage environment 126 the optimal storage environment for the one classification of the combination.

Figure 7:
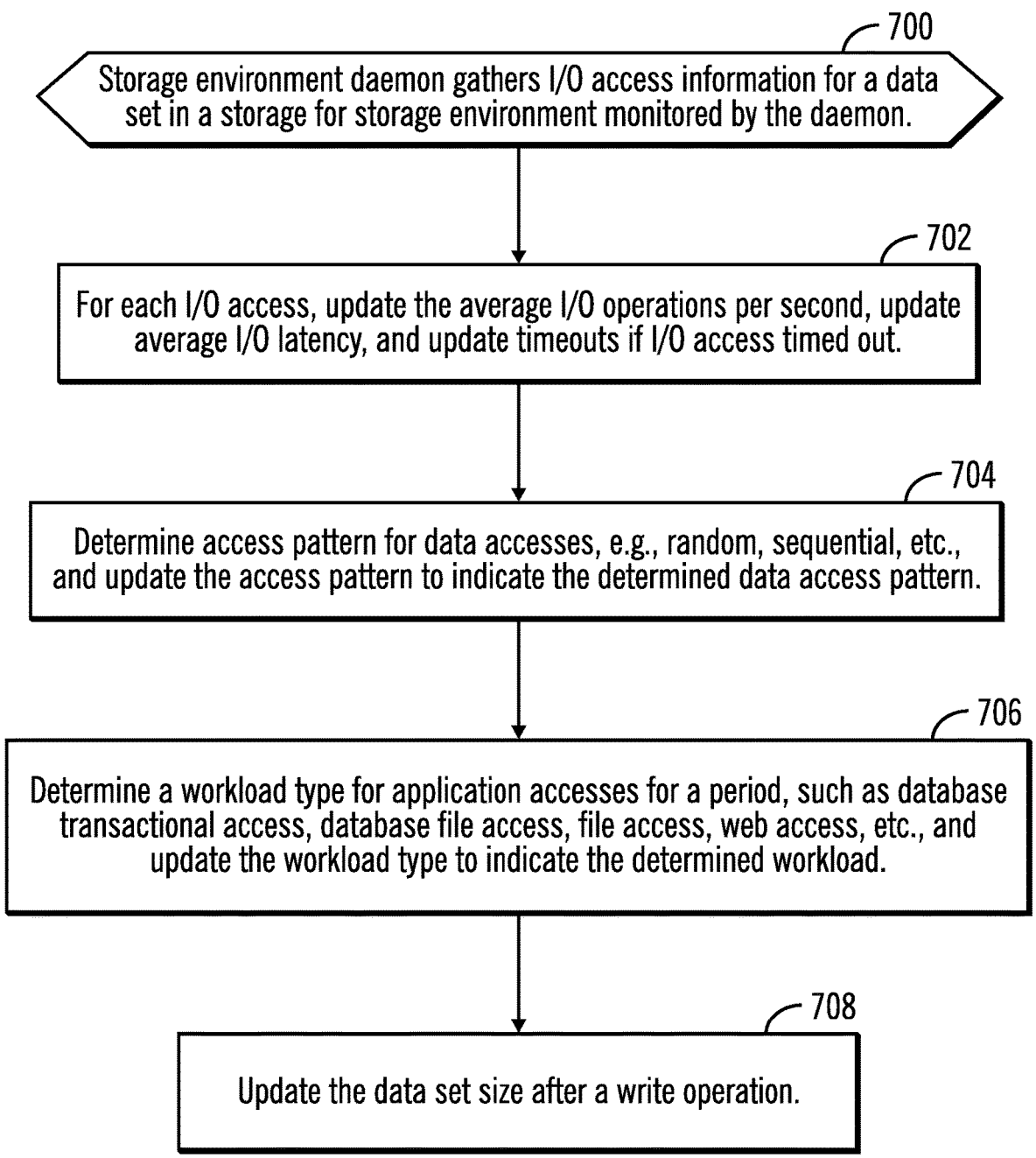
FIG. 7 illustrates an embodiment of operations to gather data access information for a data set in a storage environment.

FIG. 7 illustrates an embodiment of operations performed by the storage environment daemons $128_1$, $128_2$ ... $128_m$ to gather data access information for their respective storage environment. The storage environment daemon $128_i$ initiates (at block 700) gathering I/O access information for the data sets in a storage $106_i$ implemented in storage environment i. The storage environment daemon $128_i$ may continually gather the data access information when processing I/O requests to the storages $106_i$ managed by the daemon $128_i$. For each I/O access to a data set in a storage $106_i$ in storage environment i, the storage environment daemon $128_i$ updates (at block 702) the I/O operations per second 402, which may comprise an average; updates the average of the latency per I/O 404; and update I/O timeouts 406 if I/O access resulted in timeout. The daemon $128_i$ determines (at block 704) an access pattern for data access, such as random, sequential, etc., and updates the access pattern 410 to indicate the determined data access pattern. The daemon $128_i$ determines (at block 706) a workload type for application accesses for a period, such as database transactional access, database file access, file access, web access, etc., and update the workload type 408 to indicate the determined workload. The data set size 412 is updated (at block 708) after a write operation that modifies the data set.

With the embodiment of FIG. 7, each daemon $128_i$ manages the gathering of data access information for the storage devices in the storage environment managed by that daemon $128_i$ to continually update the data access information after processing I/O requests, also handled through the daemon $128_i$. By continually updating the data access information, the migration manager 114 has the most current data access information to input to the machine learning module 118 to obtain an access pattern classification 122 reflecting current operating conditions.

Figure 8:
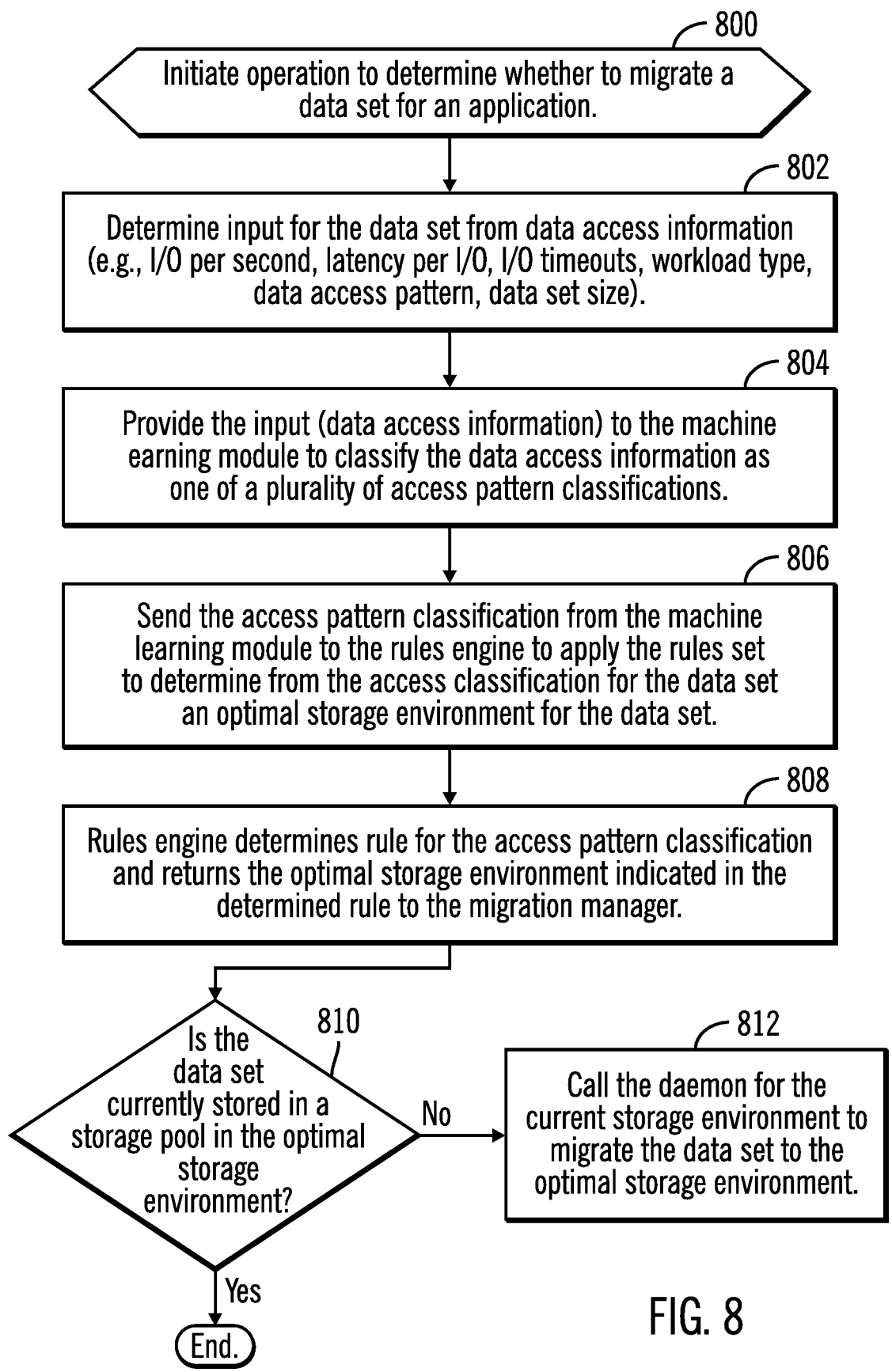
FIG. 8 illustrates an embodiment of operations to determine whether to migrate a data set for an application.

FIG. 8 illustrates an embodiment of operations performed by the migration manager 114, machine learning module 118, and rules engine 124 to determine whether to migrate a data set for an application 102 and an optimal storage environment for the data set. The migration manager 114 may perform the operations to determine whether to migrate a data set after the data access information $400_k$ for the data set $300_j$ is updated or by periodically processing the application metadata $200_i$ for an application 102 to determine whether to migrate data sets for the application 12. Upon initiating (at block 800) an operation to determine whether to migrate a data set for an application 102, the migration manager 114 determines (at block 802) input 120 for the data set $300_j$ from data access information $400_k$ (e.g., I/O per second, latency per I/O, I/O timeouts, workload type, data access pattern, data set size) and other relevant information to determining the access pattern classification, such as the application 202 or application type that is using the data set. The migration manager 114 provides (at block 804) the determined input 120 (e.g., data access information $400_k$) to the machine learning module 118 to classify the input data access information $400_k$ as one of a plurality of access pattern classifications 122. The determined access pattern classification 122 is sent (at block 806) to the rules engine 124 to apply the rules set 600 to determine from the access pattern classification 122 for the data set an optimal storage environment for the data set.

The rules engine 124 determines (at block 808) a rule $600i$ for the access pattern classification 122, such as in field 602, and returns the optimal storage environment 604 indicated in the determined rule $600_i$ to the migration manager 114. If (at block 810) the data set $300_j$ being considered is currently stored in a storage pool 304 in the optimal storage environment, i.e., the storage pool information 500, identifying the determined storage pool 304 in the allocated storage pools field 506 has as the storage environment type 504 the optimal storage environment, then control ends because the data set is already stored in the optimal storage environment. If (at block 810) the data set is not currently stored in the optimal storage environment, then the migration manager 114 calls (at block 812) the daemon $128_S$ for the source storage environment i currently storing the data set to migrate the data set to the optimal storage environment.

With the embodiment of FIG. 8, current data access information concerning I/O access performance information with respect to the data set and data set attributes, such as data set size and application type, are provided to a machine learning module 118 using a machine learning algorithm to determine an access pattern classification 122. In this way, the access pattern classification 122 is based on the current operating conditions and can be calculated within a degree of confidence to allow for accurate classification. The access classification 122 is then used to determine the optimal storage environment for the data set from a rules set 600 that identifies different optimal storage environment for different data set classifications or combinations of classifications. An administrator may continually adjust the rules set 600 to optimize the mappings of storage environments to different access pattern classifications. This allows numerous operational factors and data set features to be considered in real-time to determine whether the data set should be migrated to a more optimal and suitable storage environment for the data set.

In further embodiments, other attributes may be used as input 120 to the machine learning module 118 to optimize the optimal storage environment selection, such as government regulations, business regulations, historical trending, technology refresh (for example, all-flash initiatives) and modeling; and physical migration (i.e., migration to another datacenter, not migration between the tiers).

Figure 9:
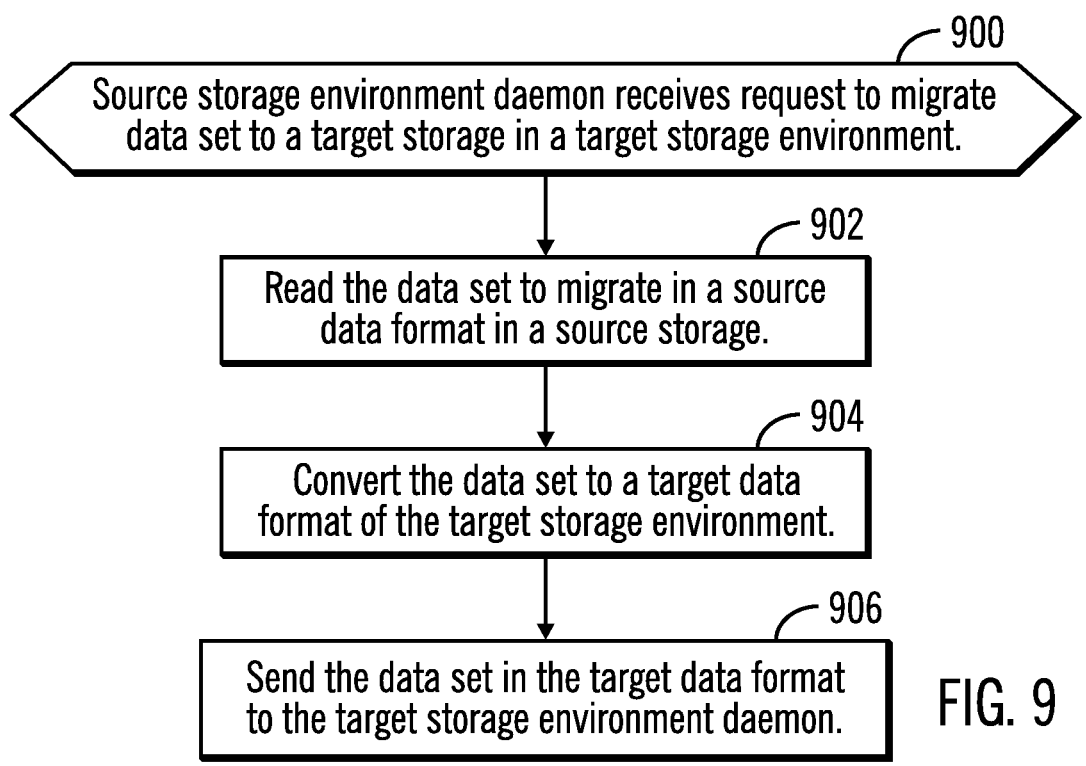
FIG. 9 illustrates an embodiment of operations to process a request to migrate a data set.

FIG. 9 illustrates an embodiment of operations performed by a source storage environment daemon $128_S$ that is called to migrate a data set stored in a storage $106_S$ to a target storage environment, comprising an optimal storage environment for the data set, managed by a target storage environment daemon $128_T$. Upon the source storage environment daemon $128_S$ receiving (at block 900) a request to migrate a data set to a target storage environment, the daemon $128_S$ reads (at block 902) the data set to migrate in a source data format in a source storage $106_S$ and converts (at block 904) the data set to a target data format of the target (optimal) storage environment. The daemon $128_S$ sends (at block 906) the data set in the target data format to the target storage environment daemon $128_T$ to store.

Figure 10:
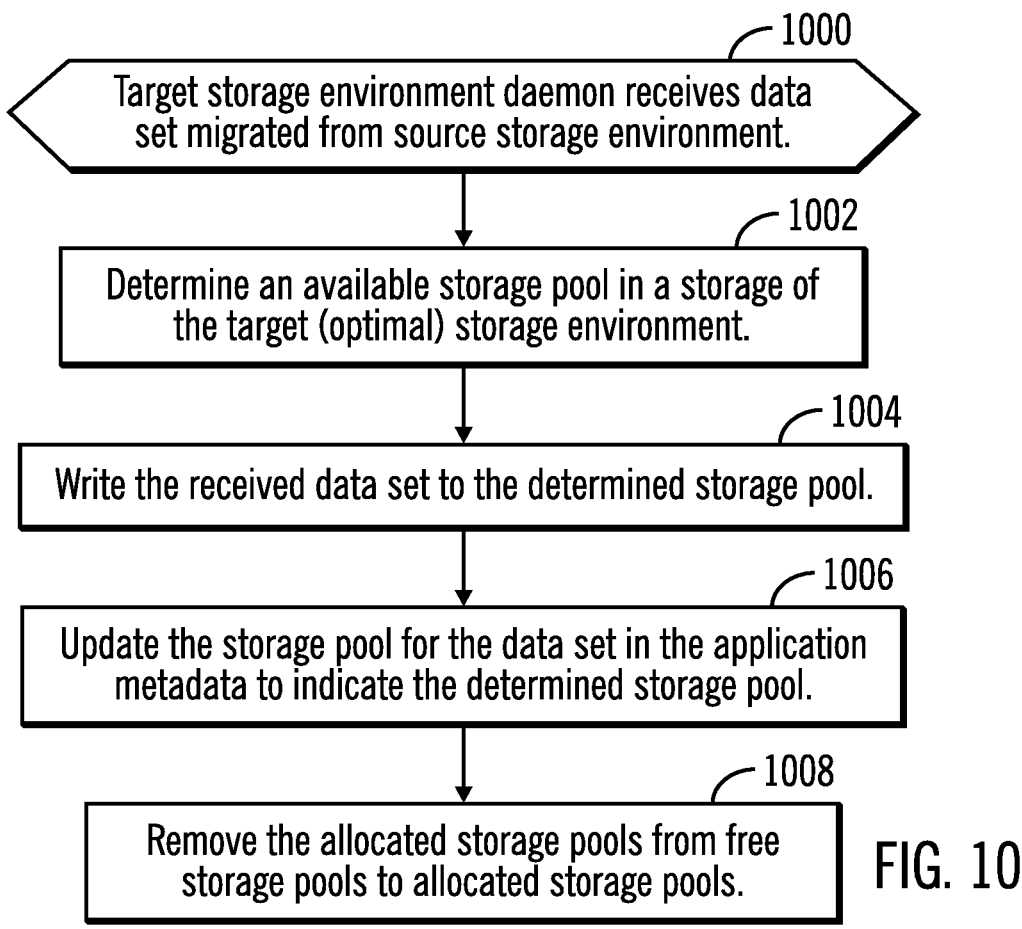
FIG. 10 illustrates an embodiment of operation to store a migrated data set in a target storage environment.

FIG. 10 illustrates an embodiment of operations performed by the target storage environment daemon $128_T$ upon receiving (at block 1000) a data set to store in a storage pool in the target storage environment, which may comprise a data set migrated from a source storage environment. The daemon $128_T$ determines (at block 1002) an available storage pool in the free storage pools 508 for the target (optimal) storage environment type 504. The daemon $128_T$ writes (at block 1004) the received data set to the determined free storage pool and updates (at block 1006) the storage pool 304 for the data set metadata $300_j$ for the received data set to indicate the determined fee storage pool in the target (optimal) storage environment. The allocated storage pool would then be removed (at block 1008) from the free storage pools 508 to the allocated storage pools 506.

With the embodiment of FIGS. 9 and 10. the storage environment daemons manage the transfer of data sets from a source storage environment to an optimal storage environment, where each of the daemons includes all the necessary functions and APIs to manage accessing data in their storage environment and to manage communication with other storage daemons as well as converting a data set to a data format of a target storage environment to which a data set is being migrated.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the storage server 100, hosts 104, and storages $106_1$, $106_2$ ... $106_m$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

Figure 11:
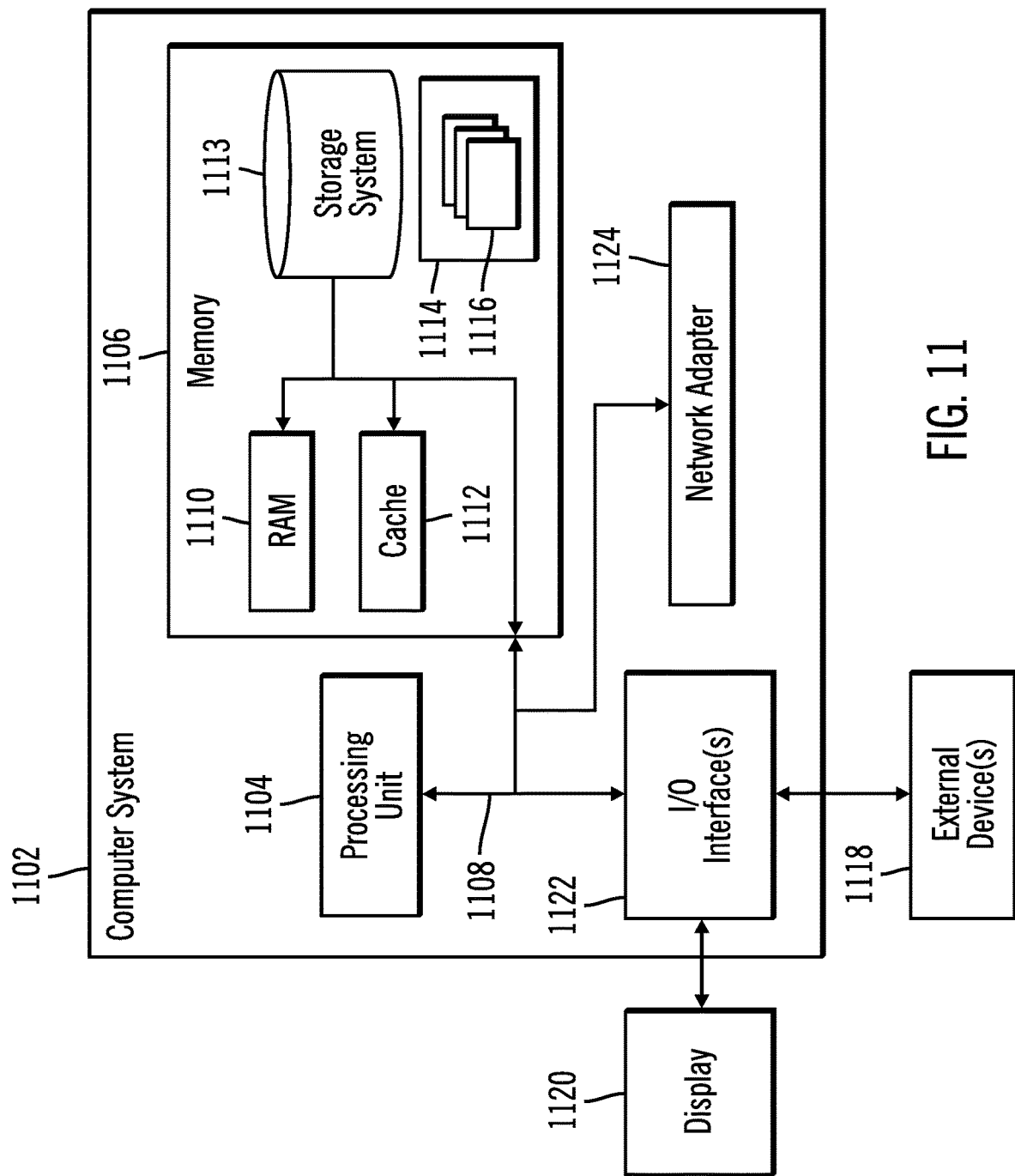
FIG. 11 illustrates a computing environment in which the components of FIG. 1 may be implemented.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing storage of data sets in a plurality of storage environments, wherein the computer program product comprises a computer readable storage medium having computer readable program code embodied therein that when executed performs operations, the operations comprising:

providing a rules set indicating storage environment types associated with different access pattern classifications, wherein there are different storage environment types associated with different access pattern classifications, and wherein the storage environment types have different data formats in which data sets are configured before being sent to a storage to store in the storage;

classifying, by a machine learning module, data access information for a data set considered for migration as an access pattern classification of the access pattern classifications, wherein the data access information comprises Input/Output (I/O) access attributes;

determining, from the rules set, a rule for the access pattern classification of the data set;

determining a storage environment type indicated in the determined rule;

in response to determining that a current storage environment type in which the data set is stored is different from the determined storage environment type, converting the data set from a current data format of the current storage environment type to a target data format of the determined storage environment type;

determining a storage of a plurality of storages having free space and that is configured in the determined storage environment type, wherein the plurality of storages are configured in the different storage environment types; and migrating the data set converted to the target data format to the determined storage.

2. The computer program product of claim 1, wherein the operations further comprise:

providing a first daemon for managing access to a first storage configured according to the current storage environment type;

providing a second daemon for managing access to a second storage configured according to the determined storage environment type;

wherein the migrating the data set comprises:
reading, by the first daemon, the data set from the first storage,
wherein the converting is performed by the first daemon; and
sending the data set in the target data format to the second daemon to write to the second storage.

3. The computer program product of claim 1, wherein the machine learning module is trained to produce one of the access pattern classifications based on the data access information for the data set.

4. The computer program product of claim 1, wherein the storage environment types include an object storage, file storage, and block storage, wherein the determining from the rules set the storage environment type for each data set comprises at least a plurality of rules that are a member of the rules comprising:

indicating the storage environment type as file storage for the data set in response to determining that the data set is accessed as a file;

indicating the storage environment type as block storage in response to an access pattern classification for the data set comprising random access pattern;

indicating the storage environment type as file storage in response to the access pattern classification for the data set comprising a sequential access pattern;

indicating the storage environment type as block storage in response to the access pattern classification for the data set comprising a high operations per second access pattern;

indicating the storage environment type as file storage in response to the access pattern classification for the data set comprising a low operations per second and processing unit intensive usage access pattern;

indicating the storage environment type as block storage in response to the access pattern classification comprising low latency, wherein the low latency occurs for data accesses requiring low latency access;

indicating the storage environment type as file storage in response to the access pattern classification comprising high latency and a data set size greater than a size threshold, wherein the high latency occurs for data accesses tolerating high latency without timing out;

indicating the storage environment type as object storage in response to the access pattern classification comprising high latency tolerant and a data set size less than a size threshold;

indicating the storage environment type as block storage in response to the access pattern classification comprising a transaction database access pattern;

indicating the storage environment type as file storage in response to the access pattern classification comprising a file database access pattern; and indicating the storage environment type as block storage in response to the access pattern classification comprising a web database access pattern.

5. The computer program product of claim 1, wherein the rules set associates a plurality of the access pattern classifications with one storage environment type.

6. The computer program product of claim 1, wherein the operations further comprise:

maintaining metadata for applications indicating, for each application, storage pools used by the application to store data sets, wherein each storage pool is configured in one of a plurality of storage types using different organization schemes to store data sets, wherein the metadata for at least one application indicates storage pools to store the data sets for the application that are allocated from different storage environment types, and wherein the metadata includes, for each data set, data access information having attributes of data access in the data set.

7. The computer program product of claim 1,
wherein the data formats of the storage environment types comprise at least two of block storage, file storage, object storage and count key data (CKD) storage, and
wherein the I/O access attributes include at least a plurality of: I/O operations per second, latency per I/O operation, number of I/O timeouts, workload type of data access, data access pattern, and data size of the data set.

8. A computer program product for managing storage of data in a plurality of storage environments, wherein the computer program product comprises a computer readable storage medium having computer readable program code embodied therein that when executed performs operations, the operations comprising:

providing a rules set indicating storage environment types associated with different access pattern classifications, wherein there are different storage environment types associated with different access pattern classifications, and wherein the storage environment types have different data formats in which data sets are configured before being sent to a storage to store in the storage;

updating data access information for the data sets with I/O access information gathered by storage environment daemons, wherein each storage environment daemon is used to gather I/O access information from each of the different storage environment types, and wherein the I/O access information comprises I/O access attributes for the data sets;

classifying, by a classification engine, data access information for a data set being considered to migrate as an access pattern classification from the access pattern classifications;

determining, from the rules set, a storage environment type for the access pattern classification for the data set;

in response to determining that a current storage environment type in which the data set is stored is different from the determined storage environment type, converting the data set from a current data format of the current storage environment type to a target data format of the determined storage environment type; and moving the data set converted to the target data format to a storage storing data in the determined storage environment type.

9. The computer program product of claim 8, wherein the access pattern classifications include at least one access pattern classification based on only one access attribute of the data access information and at least one access pattern classification based on multiple access attributes of the data access information.

10. The computer program product of claim 8, wherein the operations further comprise:
providing application metadata for applications having data sets stored in storages in one of a plurality of storage environments, wherein each application metadata for an application indicates for each data set stored for the application a storage pool in one of storages and the data access information for the data set, wherein the application metadata indicates a plurality of data sets for the application stored in storages in different storage environments.

11. The computer program product of claim 8, wherein the rules set associates a plurality of the access pattern classifications with one storage environment type.

12. The computer program product of claim 8, wherein the operations further comprise:
maintaining metadata for applications indicating, for each application, storage pools used by the application to store data sets, wherein each storage pool is configured in one of a plurality of storage types using different organization schemes to store data sets, wherein the metadata for at least one application indicates storage pools to store the data sets for the application that are allocated from different storage environment types, and wherein the metadata includes, for each data set, data access information having attributes of data access in the data set.

13. The computer program product of claim 8,
wherein the data formats of the storage environment types comprise at least two of block storage, file storage, object storage and count key data (CKD) storage, and
wherein the I/O access attributes include at least a plurality of: I/O operations per second, latency per I/O operation, number of I/O timeouts, workload type of data access, data access pattern, and data size of the data set.

14. A system for managing storage of data sets in a plurality of storage environments, comprising:
a processor; and
a computer readable storage medium having computer readable program code that when executed by the processor performs operations, the operations comprising:
providing a rules set indicating storage environment types associated with different access pattern classifications, wherein there are different storage environment types associated with different access pattern classifications, and wherein the storage environment types have different data formats in which data sets are configured before being sent to a storage to store in the storage;
classifying, by a machine learning module, data access information for a data set considered for migration as an access pattern classification of the access pattern classifications, wherein the data access information comprises Input/Output (I/O) access attributes;
determining, from the rules set, a rule for the access pattern classification of the data set;
determining a storage environment type indicated in the determined rule;
in response to determining that a current storage environment type in which the data set is stored is different from the determined storage environment type, converting the data set from a current data format of the current storage environment type to a target data format of the determined storage environment type;
determining a storage of a plurality of storages having free space and that is configured in the determined storage environment type, wherein the plurality of storages are configured in the different storage environment types; and
migrating the data set converted to the target data format to the determined storage.

15. The system of claim 14, wherein the operations further comprise:
providing a first daemon for managing access to first storage configured according to the current storage environment type;
providing a second daemon for managing access to a second storage configured according to the determined storage environment type;
wherein the migrating the data set comprises:
reading, by the first daemon, the data set from the first storage, wherein the converting is performed by the first daemon; and
sending the data set in the target data format to the second daemon to write to the second storage.

16. The system of claim 14, wherein the rules set associates a plurality of the access pattern classifications with one storage environment type.

17. The system of claim 14, wherein the operations further comprise:
maintaining metadata for applications indicating, for each application, storage pools used by the application to store data sets, wherein each storage pool is configured in one of a plurality of storage types using different organization schemes to store data sets, wherein the metadata for at least one application indicates storage pools to store the data sets for the application that are allocated from different storage environment types, and wherein the metadata includes, for each data set, data access information having attributes of data access in the data set.

18. The system of claim 14,
wherein the data formats of the storage environment types comprise at least two of block storage, file storage, object storage and count key data (CKD) storage, and
wherein the I/O access attributes include at least a plurality of: I/O operations per second, latency per I/O operation, number of I/O timeouts, workload type of data access, data access pattern, and data size of the data set.

19. A system for managing storage of data in a plurality of storage environments, comprising:
a processor; and
a computer readable storage medium having computer readable program code that when executed by the processor performs operations, the operations comprising:
providing a rules set indicating storage environment types associated with different access pattern classifications, wherein there are different storage environment types associated with different access pattern classifications, and wherein the storage environment types have different data formats in which data sets are configured before being sent to a storage to store in the storage;

updating data access information for the data sets with I/O access information gathered by storage environment daemons, wherein each storage environment daemon is used to gather I/O access information from each of the different storage environment types;

classifying, by a classification engine, data access information for a data set being considered to migrate as an access pattern classification from the access pattern classifications, wherein the data access information comprises Input/Output (I/O) access attributes;

determining, from the rules set a rule for the access pattern classification for the data set;

determining a storage environment type indicated in the determined rule;

in response to determining that a current storage environment type in which the data set is stored is different from the determined storage environment type, converting the data set from a current data format of the current storage environment type to a target data format of the determined storage environment type;

determining a storage of a plurality of storages having free space and that is configured in the determined storage environment type, wherein the plurality of storages are configured in the different storage environment types; and moving the data set converted to the target data format to the determined storage.

20. The system of claim 19, wherein the access pattern classifications include at least one access pattern classification based on only one access attribute of the data access information and at least one access pattern classification based on multiple access attributes of the data access information.

21. The system of claim 19, wherein the rules set associates a plurality of the access pattern classifications with one storage environment type.

22. The system of claim 19,
wherein the data formats of the storage environment types comprise at least two of block storage, file storage, object storage and count key data (CKD) storage, and
wherein the I/O access attributes include at least a plurality of: I/O operations per second, latency per I/O operation, number of I/O timeouts, workload type of data access, data access pattern, and data size of the data set.

23. A method for managing storage of data sets in a plurality of storage environments, comprising:
providing a rules set indicating storage environment types associated with different access pattern classifications, wherein there are different storage environment types associated with different access pattern classifications, and wherein the storage environment types have different data formats in which data sets are configured before being sent to a storage to store in the storage;

classifying, by a machine learning module, data access information for a data set considered for migration as an access pattern classification of the access pattern classifications, wherein the data access information comprises Input/Output (I/O) access attributes;

determining, from the rules set, a rule for the access pattern classification of the data set;

determining a storage environment type indicated in the determined rule;

in response to determining that a current storage environment type in which the data set is stored is different from the determined storage environment type, converting the data set from a current data format of the current storage environment type to a target data format of the determined storage environment type;

determining a storage of a plurality of storages having free space and that is configured in the determined storage environment type, wherein the plurality of storages are configured in the different storage environment types; and migrating the data set converted to the target data format to the determined storage.

24. The method of claim 23, further comprising:
providing a first daemon for managing access to a first storage configured according to the current storage environment type;

providing a second daemon for managing access to a second storage configured according to the determined storage environment type;

wherein the migrating the data set comprises:
reading, by the first daemon, the data set from the first storage, wherein the converting is performed by the first daemon; and sending the data set in the target data format to the second daemon to write to the second storage.

25. The method of claim 23, wherein the access pattern classifications include at least one access pattern classification based on only one access attribute of the data access information and at least one access pattern classification based on multiple access attributes of the data access information.

26. The method of claim 23, wherein the rules set associates a plurality of the access pattern classifications with one storage environment type.

27. The method of claim 23,
wherein the data formats of the storage environment types comprise at least two of block storage, file storage, object storage and count key data (CKD) storage, and
wherein the I/O access attributes include at least a plurality of: I/O operations per second, latency per I/O operation, number of PO timeouts, workload type of data access, data access pattern, and data size of the data set.

* * * * *